Patented May 5, 1936

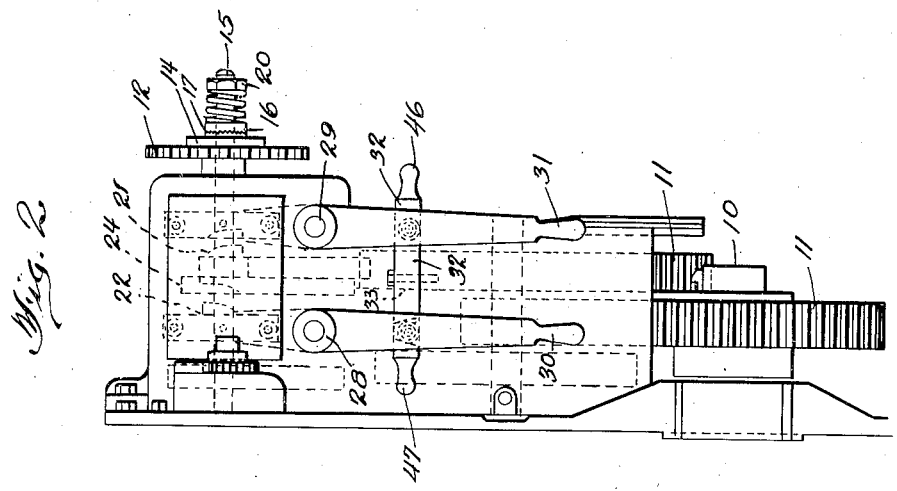
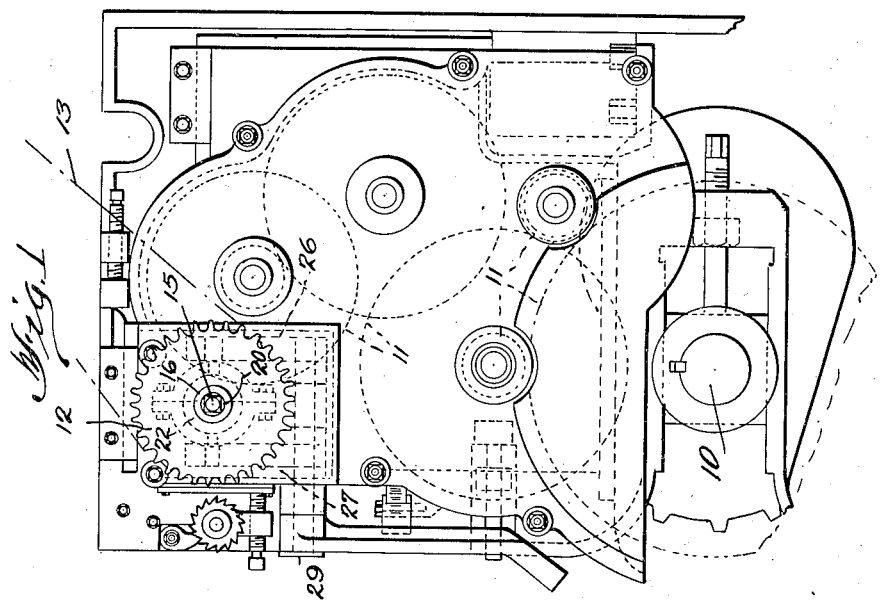

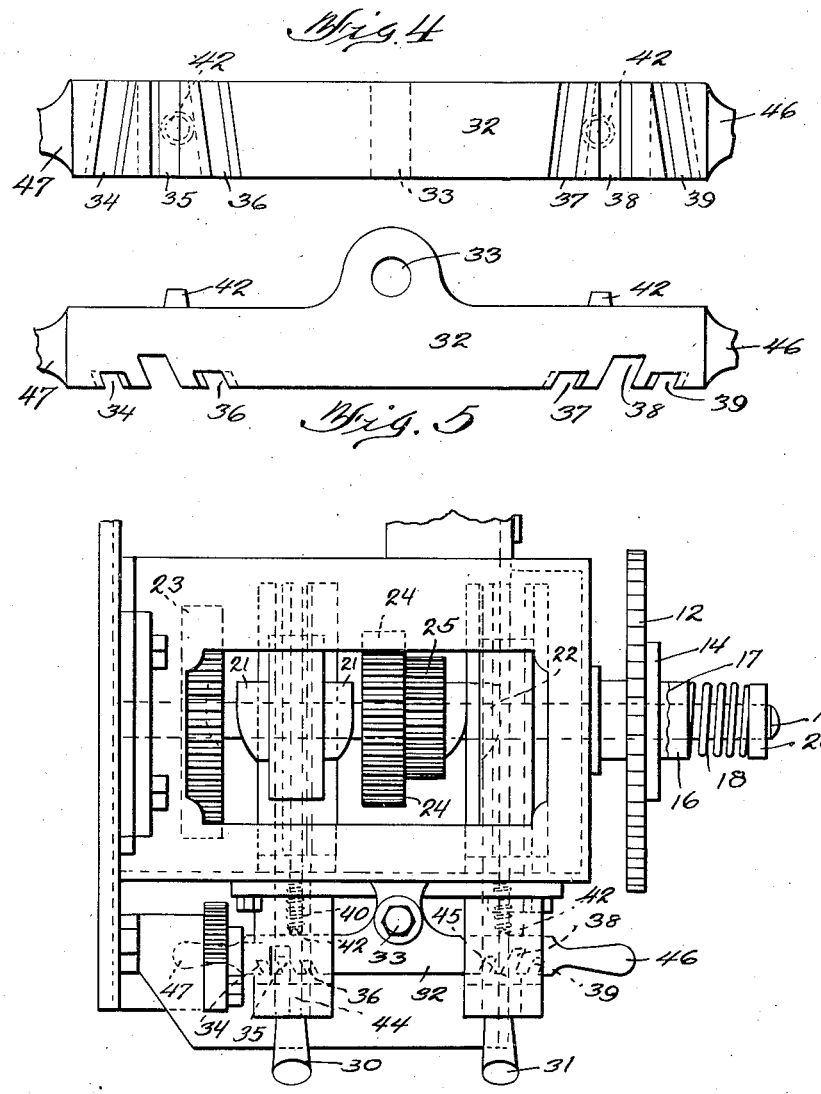

2,039,407

UNITED STATES PATENT OFFICE 2,039,407

INTERLOCKING CONTROL FOR CHANGE GEARS

Henry P. Grohn, Chicago, Ill., assignor to Mc-Clave-Brooks Company, Scranton, Pa., a corporation of Pennsylvania Original application May 6, 1926, Serial No. 107,299. Divided and this application May 28, 1932, Serial No. 614,193

11 Claims. (Cl. 74—483)

This invention relates to improvements in locking means for operating levers and has for its principal object the provision of means for preventing simultaneous operation of a plurality of levers for controlling different parts of mechanism in such a manner that when one of the levers is operated to control its mechanism another lever will be automatically locked against manipulation to control its mechanism.

An important object of the invention is to provide a positive change speed direct drive for the chain grate of a chain grate stoker and a safety lock for the change speed mechanism.

I carry out these and other objects in a change gear for a chain grate stoker, said change gear having two operating levers, one lever for connecting in either the intermediate or high speed gears while the other lever operates the low speed gear. Between these two levers is pivoted a locking lever which normally automatically locks both operating levers and can never be manipulated to release both levers at the same time and which furthermore can be manipulated to release one lever only when the other lever is in a neutral position. I also provide novel clutch means for connecting the different gears to the power shaft.

This is a division of my application Serial No. 107,299 filed May 6, 1926.

In the drawings:

Figure 1 is a side elevation of the change speed positive drive for a chain grate.

Figure 2 is a front elevation thereof.

Figure 3 is a top plan view of a portion of the mechanism.

Figure 4 is a top plan view of the safety lever.

Figure 5 is a front elevation thereof.

Usually extending across the furnace front is a drive shaft for the chain grate and this shaft is indicated in the drawings by reference numeral 10 the chain and other parts of the furnace not being shown.

The main shaft 10 is driven by gears 11 from sprocket wheel 12 and chain 13. Sprocket wheel 12 is carried on hub 14 loose on shaft 15. Splined to shaft 15 is a hub 16 having a corrugated grip face 17 normally pressed against a similar grip face on hub 14 by spring 18 held by a nut 20. Thus sprocket wheel 12 gives a drive which is positive, but which will cease to drive if the driving force required should rise above a predetermined amount, since the grip faces 17 would then slip over one another.

Splined on shaft 15 are clutches 21 and 22. Clutch 21 upon being shifted to the left engages high speed gear 23 (see Figure 3 which shows the clutches in neutral position). Clutch 21 on being shifted to the right engages intermediate speed gear 24. Clutch 22 on being shifted to the left engages low speed gear 25. Clutches 21, 22 are shifted by forks 26 and 27, secured on rock shafts 28 and 29 operated by shifting or control levers 30 and 31.

In order to prevent both of these levers from being in driving position at the same time and thereby destroying or injuring the mechanism, a safety lock lever 32 is pivoted at 33 and has arcuate notches 34 to 39 nearly concentric with pivot 33 for engagement with the control levers. Lock lever 32 is normally held in the neutral position shown in Figure 3 by springs 40, engaging over lugs 42 projecting rearwardly from the lock lever. Each shifting lever has a gear rib 44 for engagement with the notches in the locking lever as follows. Suppose, for example, that with levers 30 and 31 both in neutral as shown in Figures 2 and 3, it is desired to drive the grate at low speed, hand grip 46 of lock lever 32 is pressed rearwardly, compressing the proximate spring 40. Since the ribs 44 do not extend to the bottoms of the deep notches when the lever 32 is in neutral position, this end of the locking lever can be pushed back until rib 44 of the lever 31 is free of the deeper notch 38 at which time the lever 31 can be swung to the right until its rib 44 comes opposite the shallow notch 39. The safety lock lever 32 is now released and the compressed spring forces the right end of this lock lever 32 forward until shallow notch 39 engages rib 44 of the lever 31. At the time lever 31 was swung to the right, its clutch engaged low speed gear 25. Since notch 39 is not deep but is relatively shallow, pressure on left hand grip 47 will not be able to release rib 44 of the lever 30 from the notch 35. It will thus be seen that when the rib of either lever is in a shallow notch as it would be in any driving position, the other shifting or control lever is held locked in neutral since this other lever cannot be moved out of its deep notch or neutral position.

What I claim is:

1. In combination, a pair of control levers, each control lever having a neutral position and one or more clutching positions in which it connects driving mechanism, a manually movable locking member extending transversely beyond the control levers at both sides, one of said extensions being a handle, said member and said levers having coacting surfaces, the surfaces having interengaging configurations so that the member has such interengagement with the control levers, that when either control lever is out of neutral position, the other control lever cannot be moved out of neutral position, without first moving the locking member by hand.

2. In combination, a pair of control levers, each control lever having a neutral position and one or more clutching positions in which it connects driving mechanism, a manually movable locking member extending transversely beyond the control levers at both sides and having interengagement with the control levers normally to lock said levers against movement, said interengagement permitting limited movement of the locking member to release one lever from neutral position to a point of different interengagement with the locking member, said different interengagement permitting more limited movement of the locking member so that when either control lever is out of neutral position, the other control lever cannot be moved out of neutral position, said control levers being parallel in neutral position and mounted to swing in parallel planes, said locking member being pivoted intermediate the control levers, and handles on said member whereby it may be swung in a plane transverse of the control levers when a control lever is to be moved into or out of neutral position.

3. In combination, a pair of control levers, each control lever having a neutral position and one or more clutching positions in which it connects driving mechanism, a locking lever pivoted intermediate its ends and intermediate the control levers and adapted to be swung in a plane transverse of the control levers, said locking lever having one neutral position notch and one or more clutching position notches adjacent each end, each control lever being adapted to have engagement with the locking lever by one neutral position notch while the other control lever is simultaneously engaged with the locking lever whereby the other neutral position notch and either end of the locking lever are adapted to be swung away from engagement with a control lever whereby the last mentioned control lever is freed for movement into a clutching position notch and the other control lever is retained locked by its neutral position notch.

4. The combination of claim 3 in which the neutral position notches are deeper than the clutching position notches.

5. The combination of claim 3 in which the locking lever has both its ends similarly yieldably pressed toward the control levers.

6. In combination, a pair of operating levers pivoted to turn about separate axes, said axes being spaced and lying in the same plane, a locking member pivoted to swing in a plane parallel to the first mentioned plane and movable into and out of engagement with one of said levers and simultaneously out of and into engagement with the other lever, the configuration of the levers and locking member being such that said engagements are locking engagements whereby either one of the levers is locked against movement while the other is released for operation to another position where it is again locked upon release of the locking member.

7. In a device including a pair of operating levers, a locking member movable into and out of locking engagement with one of said levers and simultaneously out of and into locking engagement with the other lever whereby one of the levers is locked against movement while the other is released for operation, said levers having limited movement, and graduated locking means provided in said member between and at the respective limits of the respective movements of said levers, means for urging each end of said member toward its cooperating lever to bring the lever and registering locking means into locking engagement, said locking means determining the amount of movement of said member.

8. In a device including a pair of operating levers, a locking member movable into and out of locking engagement with one of said levers and simultaneously out of and into locking engagement with the other lever whereby one of the levers is locked against movement while the other is released for operation, said member having a set of a plurality of locking notches on each side of the pivot for determining the arc of turning about the pivot, a rib on each lever for engaging in one of its respective sets of notches as the end of the member is turned about its pivot toward the lever, one notch in each set being deep to allow the member to turn toward one lever far enough to free the rib on the other lever whereby one lever is securely locked at the time the other lever is free.

9. In combination a control lever adapted to move over a limited segment in a plane, a locking lever pivoted to swing against the control lever and in a plane normal to said first mentioned plane, said locking lever having notches therein corresponding to the neutral and limiting positions of said control lever as it moves over the segment, the neutral notch being deeper than the other notches to allow the locking lever to turn farther about its pivot, a second control lever mounted to swing over a segment in a plane parallel to the plane of movement of the first control lever and positioned to prevent the turning of said locking lever away from said first control lever, additional notches in said locking lever for engaging said second control lever and corresponding to its neutral and limiting positions the neutral being deeper than the other notches to allow the locking lever to turn farther about its pivot away from said first lever only when said second lever is in neutral position to thereby free said first lever and allow same to be moved to any one of its operating positions.

10. In combination, a pair of control levers, each control lever having a neutral position and one or more clutching positions in which it connects driving mechanism, a manually movable locking member extending transversely beyond the control levers at both sides and normally engaging the control levers, to lock the same against movement, said engagement being of the tongue and groove type, the depth of engagement of the tongue in the groove being determined by the location of the levers such that the location of either control lever in neutral position permits the manual disengagement of the locking member from the other control lever to permit said other control lever to be moved to one of its clutching positions and the locating of said other control lever in one of said clutching positions prevents the disengagement of the locking member from said one control lever.

11. In combination, a pair of control levers each being shiftable to a plurality of positions of operation, a manually movable locking member normally spring pressed into locking engagement with both levers, said member having a plurality of points for locking engagement with each lever whereby to lock the levers in any selected position of operation, said locking engagement being of the tongue and groove type with the cooperating walls of the tongue and groove substantially normal to the path of movement of the levers whereby during locking engagement preventing movement of the levers while at the same time permitting movement of the locking member to release either one of said levers, a handle for moving and holding said member against its spring pressure to release a chosen one of said levers, and means for shifting the released lever to a selected position of operation.

HENRY P. GROHN.